United States Patent
Fakoorian et al.

(10) Patent No.: US 12,101,805 B2
(45) Date of Patent: Sep. 24, 2024

(54) CHANNEL OCCUPANCY RATE DETERMINATION IN UNLICENSED SPECTRUM

(71) Applicant: Apple Inc., Cupertino, CA (US)

(72) Inventors: Seyed Ali Akbar Fakoorian, San Diego, CA (US); Dawei Zhang, Saratoga, CA (US); Chunxuan Ye, San Diego, CA (US); Oghenekome Oteri, San Diego, CA (US); Wei Zeng, Saratoga, CA (US); Yushu Zhang, Beijing (CN); Weidong Yang, San Diego, CA (US); Hong He, San Jose, CA (US); Chunhai Yao, Beijing (CN); Huaning Niu, San Jose, CA (US); Sigen Ye, Whitehouse Station, NJ (US); Haitong Sun, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,241

(22) PCT Filed: Jan. 14, 2021

(86) PCT No.: PCT/CN2021/071763
§ 371 (c)(1),
(2) Date: Sep. 20, 2021

(87) PCT Pub. No.: WO2022/151151
PCT Pub. Date: Jul. 21, 2022

(65) Prior Publication Data
US 2023/0362987 A1 Nov. 9, 2023

(51) Int. Cl.
*H04W 74/0808* (2024.01)
*H04W 16/14* (2009.01)

(52) U.S. Cl.
CPC ....... *H04W 74/0808* (2013.01); *H04W 16/14* (2013.01)

(58) Field of Classification Search
CPC ............. H04W 74/0808; H04W 16/14; H04W 72/542; H04W 72/51; H04W 52/245
See application file for complete search history.

(56) References Cited

U.S. PATENT DOCUMENTS

| | | | |
|---|---|---|---|
| 2018/0035331 A1* | 2/2018 | Sundman | H04W 56/001 |
| 2018/0205423 A1* | 7/2018 | Sanderovich | H04B 7/0417 |

(Continued)

FOREIGN PATENT DOCUMENTS

| | | | |
|---|---|---|---|
| CN | 106559830 A | | 4/2017 |
| JP | 2004007249 | * | 1/2004 |
| WO | WO 2020/159733 A1 | | 8/2020 |

OTHER PUBLICATIONS

International Search Report for Application No. PCT/CN2021/071763 mailed Oct. 12, 2021, 4 pages.

(Continued)

*Primary Examiner* — Dinh Nguyen
(74) *Attorney, Agent, or Firm* — Sterne, Kessler, Goldstein & Fox P.L.L.C.

(57) ABSTRACT

Some aspects of this disclosure relate to apparatuses and methods for implementing techniques for channel occupancy rate determination of a channel between a user equipment (UE) and a base station in an unlicensed spectrum. A UE can perform measurements based on a measurement configuration from the base station, and further determine a channel occupancy rate of the channel based on the performed measurements. The measurement configuration indicates to the UE to perform an omni measurement or a directional measurement by using an antenna element of the (Continued)

UE. The UE can further transmit a report to the base station to indicate the channel occupancy rate.

18 Claims, 6 Drawing Sheets

(56) References Cited

U.S. PATENT DOCUMENTS

| | | | | |
|---|---|---|---|---|
| 2019/0268971 A1* | 8/2019 | Talarico | ................ | H04W 76/27 |
| 2020/0015236 A1 | 1/2020 | Kung et al. | | |
| 2020/0383136 A1* | 12/2020 | Xie | ........................ | H04W 16/28 |
| 2020/0389800 A1* | 12/2020 | Laghate | ................. | H04B 7/088 |
| 2021/0352509 A1* | 11/2021 | Sundberg | ............. | H04B 17/345 |
| 2022/0007239 A1* | 1/2022 | Roy | .................. | H04W 36/0094 |

OTHER PUBLICATIONS

Written Opinion for Application No. PCT/CN2021/071763 mailed Oct. 12, 2021, 4 pages.

Qualcomm Incorporated, "On RSSI and channel occupancy measurements in NR-U", 3GPP TSG-RAN WG4 Meeting #93, R4-1915189, Nov. 22, 2019 (Nov. 22, 2019).

Nokia et al., "RSSI and CO Measurements in NR-U", 3GPP TSG-RAN WG4 Meeting #95e, R4-2007265, Jun. 5, 2020 (Jun. 5, 2020).

* cited by examiner

CHANNEL OCCUPANCY RATE DETERMINATION IN UNLICENSED SPECTRUM

This application is a U.S. National Phase of International Application No. PCT/CN2021/071763, filed Jan. 14, 2021, which is hereby incorporated by reference in its entirety.

BACKGROUND

Field

The described aspects generally relate to wireless communication in unlicensed spectrum.

Related Art

The fifth generation (5G) new radio (NR) in unlicensed spectrum (NR-U) provides the technology for cellular operators to fully integrate the unlicensed spectrum into 5G networks. NR-U enables both uplink and downlink operations in unlicensed bands, supporting 5G new features such as wideband carriers. In NR-U, channel access in both downlink and uplink relies on the listen-before-talk (LBT) feature. A wireless device or a base station must first "sense" the communication channel to be "free" prior to any transmission.

SUMMARY

Some aspects of this disclosure relate to apparatuses and methods for implementing techniques for channel occupancy rate determination of a channel between a user equipment (UE) and a base station in an unlicensed spectrum, e.g., new radio unlicensed spectrum (e.g., 60 GHz), or an unlicensed spectrum in other wireless systems. A UE can perform various measurements based on a measurement configuration from the base station, and further determine a channel occupancy rate of the channel based on the performed measurements. The channel occupancy rate can be defined in various ways. e.g., as a quotient of a number of busy slots with respect to a total number of slots within a sliding window, or as a quotient of a measurement of received signal strength indicator (RSSI) within a reference signal measurement window with respect to a channel occupancy threshold value. The measurement of RSSI can be an omni measurement or a directional measurement. The UE can further transmit a report to the base station to indicate both the measurement of RSSI and the channel occupancy rate.

Some aspects of this disclosure relate to a UE. The UE can include one or more antenna panels, and a processor communicatively coupled to the one or more antenna panels. The one or more antenna panels can be configured to wirelessly communicate with a base station over a channel in an unlicensed spectrum. e.g., a frequency band higher than 52.6 Ghz. An antenna element of the one or more antenna panels can be a pseudo-omni antenna element or a quasi-sector-omni antenna element including a phase shifter, where a directional receiving beam can be formed by adjusting the phase shifter of the antenna element for performing the directional measurement. The one or more antenna panels can include 3 antenna panels, and an antenna panel can include 2, 4, 8, or 16 antenna elements. The antenna element can include a dipole antenna element, a monopole antenna element, a patch antenna element, a loop antenna element, a microstrip antenna element, a single antenna element with multiple apertures, or an antenna element for transmission of radio frequency (RF) signal.

According to some aspects, the processor of the UE is configured to receive a measurement configuration from the base station. The measurement configuration can indicate to the UE to perform an omni measurement or a directional measurement by using an antenna element of the antenna panel. Afterwards, the processor is configured to perform, or cause to perform, the omni measurement or the directional measurement based on the measurement configuration, and further determine a channel occupancy rate of the channel based on the performed measurement. In addition, the processor is configured to transmit a report to the base station to indicate the channel occupancy rate.

According to some aspects, the measurement configuration can indicate to the UE to sense a first number of slots that are busy among a total number of slots within a sliding window of slots configured by the base station. The channel occupancy rate can be determined by a quotient of the first number divided by the total number of slots.

According to some aspects, the measurement configuration can indicate to the UE to perform a measurement of received signal strength indicator (RSSI) within a reference signal measurement window. The measurement configuration can also indicate to the UE the RSSI measurement period and location. The channel occupancy rate is determined as a quotient of the measurement of RSSI divided by a channel occupancy threshold value. The channel occupancy threshold value can be selected by the UE based on a channel bandwidth of the channel. The reference signal measurement window can have a periodicity of 5 ms, 10 ms, or 20 ms.

According to some aspects, the measurement configuration can include a configuration to perform the omni measurement of RSSI or the directional measurement of RSSI with configured transmission configuration indicator (TCI) state information of the base station. The report transmitted to the base station can include the measurement of RSSI, the channel occupancy rate, an update to the TC state information, an average of a plurality of measurements of RSSI over a period of time, and an average of a plurality of channel occupancy rates over the period of time.

According to some aspects, the measurement configuration can indicate for the UE to perform the omni measurement of RSSI when the measurement configuration does not include transmission configuration indicator (TCI) state information, and to perform the directional measurement of RSSI when the measurement configuration includes the TC state information of the base station.

Some aspects of this disclosure relate to a base station. A base station can include a transceiver configured to wirelessly communicate with a UE over a channel in an unlicensed spectrum, and a processor communicatively coupled to the transceiver. The processor can be configured to determine a measurement configuration for reporting a channel occupancy rate by the UE. The measurement configuration can indicate to the UE to perform an omni measurement or a directional measurement by using an antenna element of the UE. The processor can be further configured to transmit, to the UE, the determined measurement configuration. Afterwards, the processor can be configured to receive, from the UE, a report to indicate the channel occupancy rate for the channel between the UE and the base station determined based on the measurement configuration.

According to some aspects, the measurement configuration indicates to the UE to perform a measurement of RSSI within a reference signal measurement window, where the channel occupancy rate is determined as a quotient of the measurement of RSSI divided by a channel occupancy threshold value. The measurement configuration can also indicate to the UE to perform the omni measurement or the directional measurement of received signal strength indicator (RSSI) within a reference signal measurement window. The directional measurement of RSSI is performed with TC state information of the base station. The TCI state information of the base station can be configured by medium access control (MAC) control element (CE).

According to some aspects, the processor of the base station is further configured to adjust the channel between the UE and the base station to use another carrier that has a smaller channel occupancy rate than the channel occupancy rate received from the UE, when the UE is capable to support component carrier (CA). Similarly, the processor of the base station can be configured to adjust the channel between the UE and the base station to use a carrier in a frequency range different from a current frequency range of the channel between the UE and the base station, when the UE supports two different frequency ranges. Furthermore, the processor of the base station can enable clear channel assessment (CCA) to control interference in a current cell that includes the UE caused from operations in a neighboring cell of the current cell, or enable receiver side CCA to control interference to the current cell caused from operations in the neighboring cell.

According to some aspects, the received report can include the measurement of RSSI, and the processor of the base station can be further configured to adjust a maximum value used in a CCA check to generate a random number for deferred transmission.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
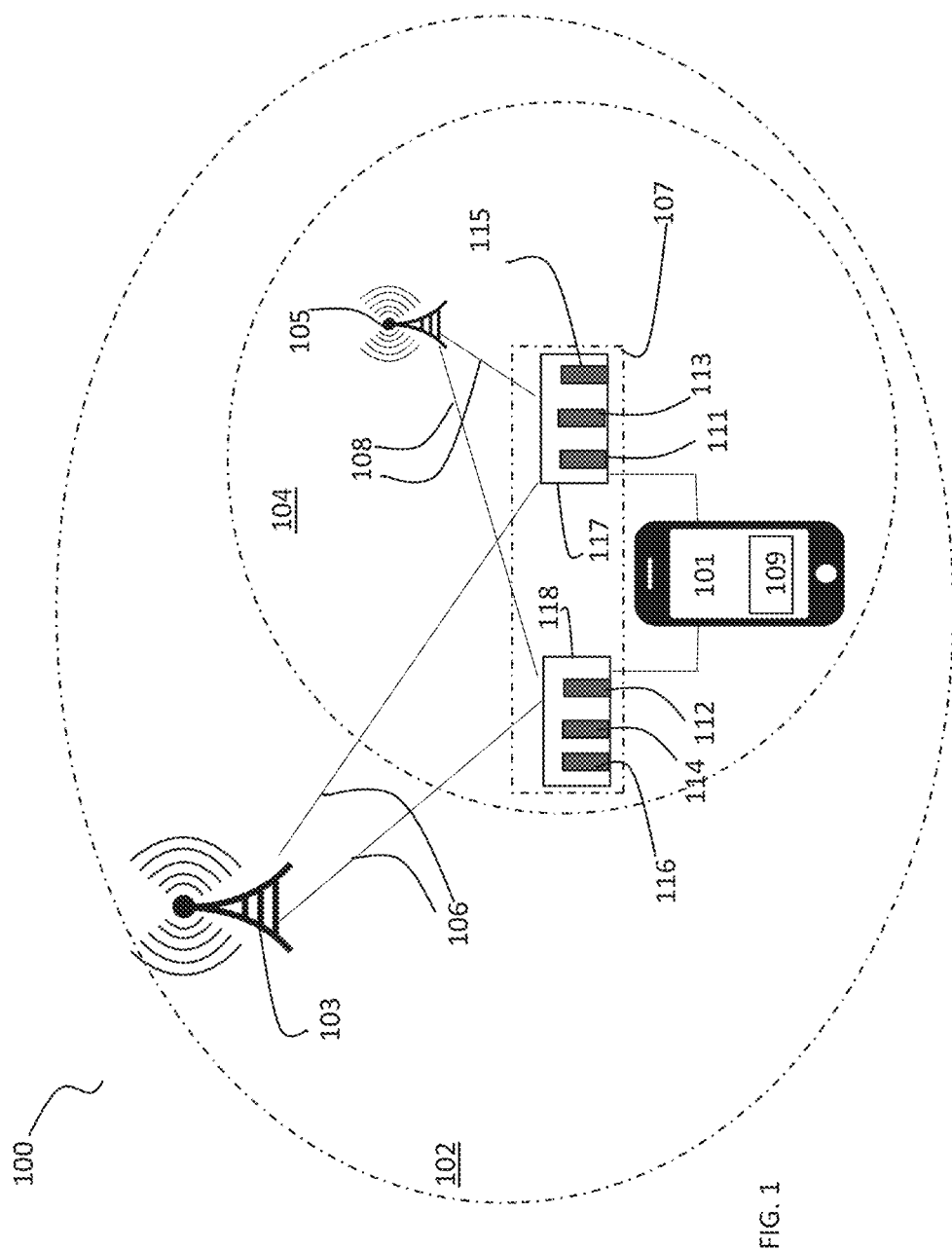
FIG. 1 illustrates a wireless system including a user equipment (UE) to wirelessly communicate with a base station over a channel in an unlicensed spectrum, where the UE has at least an antenna panel including multiple antenna elements, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

New Radio (NR) in unlicensed spectrum (NR-U) can have a variety of options for flexibly utilizing unlicensed spectrum, such as license-assisted access (LAA), or stand-alone mode. The unlicensed spectrum can include the 2.4 GHz, 5 GHz, or millimeter-wave (mmWave) carrier frequencies (30-300 GHz) bands, e.g., above 52.6 GHz. Millimeter-wave frequencies above 52.6 GHz have a great potential for various services. For example, the frequency range from 57-71 GHz can be used for unlicensed wireless communication and intelligent transportation system (ITS) applications. In mmWave bands, directional communications using directional antenna elements are desirable due to propagation conditions. In some examples, a smart antenna system can be used, where all antenna elements are considered as pseudo-omni or quasi-sector-omni antenna elements including a phase shifter. A directional receiving beam can be formed by adjusting the phase shifter of the antenna element. Directional beamforming can be used to overcome propagation limits like severe pathloss, blocking, and oxygen absorption. In addition, it is important to enable a fair and harmonious coexistence between NR-U and other wireless systems in the unlicensed spectrum, such as Wi-Fi in the 5 GHz band (IEEE 802.11a/n/ac/ax) and directional multi-Gigabit Wi-Fi in the 60 GHz band (IEEE 802.11ad/ay, also known as Wireless Gigabit (WiGig)).

In an unlicensed spectrum, a Listen-Before-Talk (LBT) mechanism can be used to sense the channel occupancy using a Clear Channel Assessment (CCA) check before utilizing the channel. CCA uses energy detection (ED) to detect the presence (i.e., channel is busy) or absence (i.e., channel is free) of other signals on the channel. If the detected energy during an initial CCA period is lower than a certain threshold, the channel is deemed to be free, and the device can utilize the channel for a period called channel occupancy time (COT). On the other hand, when the detected energy during an initial CCA period is higher than the threshold, the channel is deemed to be busy, and the device cannot utilize the channel. Hence, under LBT, the channel is determined to be in a binary state, either busy or free. In addition, LBT can suffer from the hidden node and exposed node problems due to the differences in the sensing, transmission, and reception ranges.

Some aspects of this disclosure provide mechanisms to extend the LBT. Instead of determining a channel to be busy or free as a binary state, a UE can perform an omni measurement or a directional measurement, and determine a channel occupancy rate of the channel based on the performed measurement. A channel occupancy rate can be defined as a real number ranging from 0 to a number larger than 1, instead of a binary value representing busy or free. In addition, the measurements used to calculate the channel occupancy rate can be measured by an omni measurement, or a directional measurement. Furthermore, since the channel occupancy rate for a channel is a real number, based on such a channel occupancy rate, a first channel can be less busy than a second channel when the channel occupancy rate of the first channel is smaller than the channel occupancy rate of the second channel. Accordingly, a base station can move or adjust the channel between the UE and the base station to use another carrier that has a smaller channel occupancy rate than the channel occupancy rate received from the UE, when the UE is capable to support component carrier (CA). If LBT is used, a base station would not be able to determine one channel to be less busy than another, hence not be able to move the channel to a less busy channel.

Figure 2:
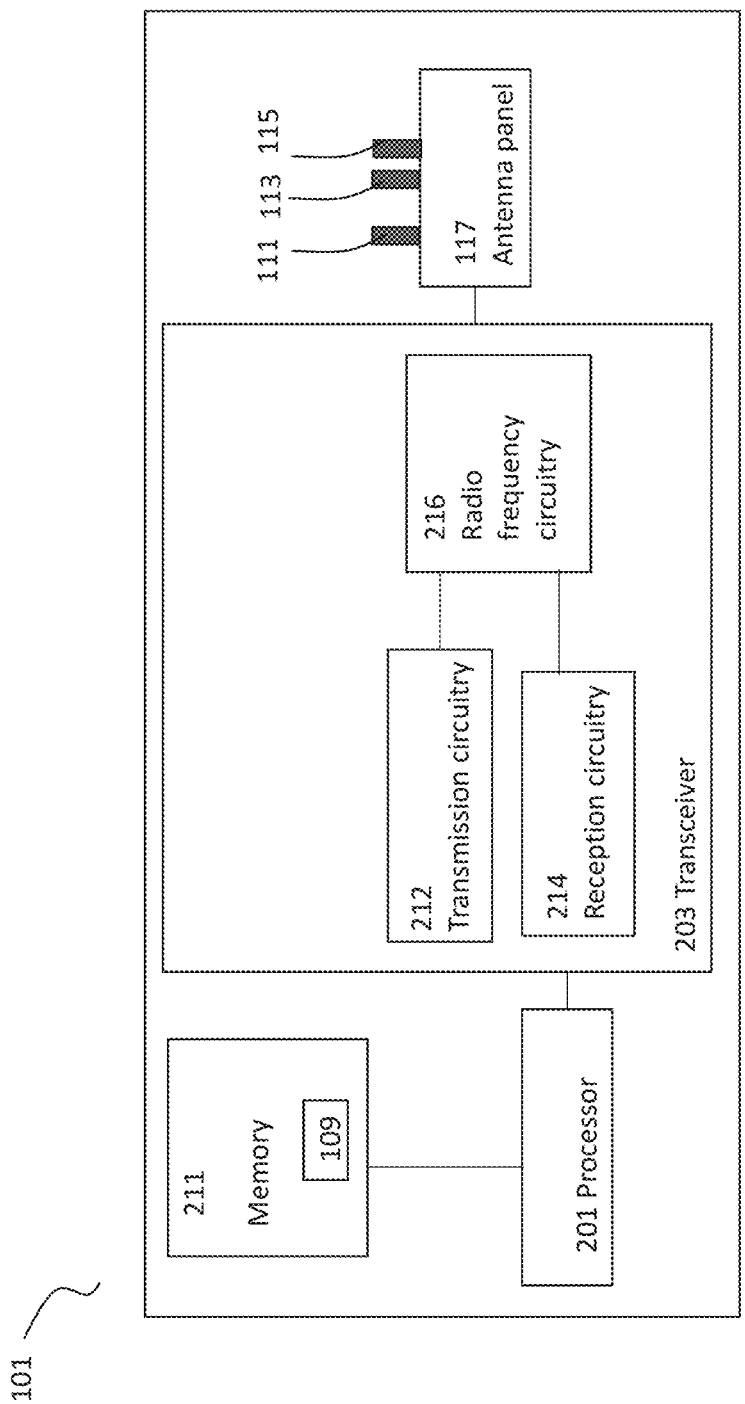
FIG. 2 illustrates a block diagram of a UE having at least an antenna panel including multiple antenna elements, according to some aspects of the disclosure.

FIG. 1 illustrates a wireless system 100 including a UE 101 to wirelessly communicate with a base station 103 over a channel in an unlicensed spectrum, where UE 101 has at least an antenna panel including multiple antenna elements, according to some aspects of the disclosure. FIG. 2 illustrates a block diagram of a UE, e.g., UE 101, having at least an antenna panel including multiple antenna elements. Wireless system 100 is provided for the purpose of illustration only and does not limit the disclosed aspects. Wireless system 100 can include, but is not limited to, UE 101, base station 103, and a base station 105. UE 101 communicates with base station 103 over channel 106 in an unlicensed spectrum, and communicates with base station 105 over channel 108, which can be an unlicensed spectrum or a licensed spectrum. In some embodiments, wireless system 100 can be a standalone system including only base station 103 and UE 101, without base station 105. In some examples, wireless system 100 can be a NR-U system, a LTE system, a 5G system, or some other wireless system. There can be other network entities, e.g., network controller, a relay station, not shown.

According to some aspects, channel 106 can be in various unlicensed spectrum, e.g., sub 7 GHz, or mmWave bands, e.g., 37 Ghz band, 60 GHz bands, or any frequency band higher than 52.6 Ghz. Accordingly, wireless system 100 can be any wireless system, e.g., an indoor sub 7 GHz system, an indoor mmWave system, an outdoor sub 7 GHz system, or an outdoor mmWave system.

According to some aspects, channel 108 can be in an unlicensed spectrum or a licensed spectrum. Accordingly, wireless system 100 can be a wireless system having carrier aggregation (CA) between licensed band NR and unlicensed band NR-U. Similarly, wireless system 100 can be a wireless system having dual connectivity between licensed band LTE and unlicensed band NR-U, standalone unlicensed band NR-U, NR with downlink in unlicensed band and uplink in licensed band, dual connectivity between licensed band NR and unlicensed band NR-U. In addition, wireless system 100 can support a wide range of use cases such as enhanced mobile broad band (eMBB), massive machine type communications (mMTC), ultra-reliable and low-latency communications (URLLC), and enhanced vehicle to anything communications (eV2X).

According to some aspects, base station 103 and base station 105 can be a fixed station or a mobile station. Base station 103 and base station 105 can also be called other names, such as a base transceiver system (BTS), an access point (AP), a transmission/reception point (TRP), an evolved NodeB (eNB), a next generation node B (gNB), a 5G node B (NB), or some other equivalent terminology.

According to some aspects, base station 103 can provide wireless coverage for a cell 102, while base station 105 can wireless coverage for a cell 104 contained within cell 102. In some other embodiments, cell 102 can overlap partially with cell 104. Cell 102 or cell 104 can be a macro cell, a pico cell, a femto cell, and/or another type of cell. For comparison, a macro cell can cover a relatively large geographic area, e.g., several kilometers in radius, a femto cell can cover a relatively small geographic area. e.g., a home, while a pico cell covers an area smaller than the area covered by a macro cell but larger than the area covered by a femto cell. For example, cell 102 can be a macro cell, while cell 104 can be a pico cell or a femto cell. In addition, cell 102 can be a pico cell and cell 104 can be a femto cell. In some examples, the geographic area of a cell can move according to the location of a mobile base station. In some examples, base station 103 and base station 105 can be interconnected to one another and/or to other base station or network nodes in a network through various types of backhaul interfaces such as a direct physical connection, a virtual network, and/or the like, not shown.

According to some aspects, UE 101 can be stationary or mobile. UE 101 can be a cellular phone (e.g., a smart phone), a personal digital assistant (PDA), a wireless modem, a wireless communication device, a handheld device, a laptop, a desktop, a cordless phone, a wireless local loop station, a tablet, a camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, UE 101 can include an antenna 107 having a plurality of antenna panels, e.g., an antenna panel 117, and an antenna panel 118. In general, antenna 107 can include one or more antenna panels. An antenna panel can include an array of antenna elements that can be located in close physical location. For example, antenna panel 118 can include antenna element 112, antenna element 114, and antenna element 116, while antenna panel 117 can include antenna element 111, antenna element 113, and antenna element 115. Any antenna element, e.g., antenna element 111, antenna element 113, and antenna element 115, antenna element 112, antenna element 114, and antenna element 116, can be an omnidirectional antenna element, a quasi-omnidirectional antenna element, or a directional antenna element. In some examples, antenna 107 can be a smart antenna system, where all antenna elements are considered as pseudo-omni or quasi-sector-omni antenna elements including a phase shifter. A directional receiving beam can be formed by adjusting the phase shifter of the antenna element. Antenna panel 117 and antenna panel 118 are only shown as examples. In some examples, there can be 3 antenna panels, and an antenna panel of the 3 antenna panels includes 2, 4, 8, or 16 antenna elements. Antenna element 111, antenna element 113, antenna element 115, antenna element 112, antenna element 114, and antenna element 116 can include a dipole antenna element, a monopole antenna element, a patch antenna element, a loop antenna element, a microstrip antenna element, or any other type of antenna elements suitable for transmission of RF signals.

FIG. 2 illustrates a block diagram of UE 101, having antenna panel 117 including antenna element 111, antenna element 113, antenna element 115. Antenna element 111, antenna element 113, antenna element 115 share a same transceiver 203 and controlled by processor 201. In detail, transceiver 203 can include radio frequency (RF) circuitry 216, transmission circuitry 212, and reception circuitry 214. RF circuitry 216 can include multiple parallel RF chains for one or more of transmit or receive functions, each connected to one or more antenna elements of the antenna panel. In addition, processor 201 can be coupled to a memory device 211, where measurement configuration 109 can be stored. Processor 201, alone or in combination with instructions stored in memory device 211 and the transceiver 203, can perform or cause to per perform, the channel occupancy rate determinations and functionality described herein.

Furthermore, antenna element 111, antenna element 113, antenna element 115 of antenna panel 117 can share common power procedures (e.g., that may be collectively powered on or powered off), can be used to form a shared beam (e.g., by controlling a gain, phase shift of individual antenna element). In some multiple-input multiple-output (MIMO) embodiments, one or more of the antennas elements can be effectively separated to take advantage of spatial diversity and the different channel characteristics. FIG. 2 only shows the circuitry for one antenna panel, e.g., antenna panel 117. Additional circuitry for other antenna panels, e.g., antenna panel 118 can have additional circuitry similar to that shown in FIG. 2. In some embodiments, circuitry for antenna panel 117 and circuitry for antenna panel 118 can share some components.

According to some aspects, UE 101 can communicate with base station 103 using a single antenna panel for both uplink and downlink transmission. Base station 103 can transmit a panel configuration message to identify a default antenna panel for UE 101, and a secondary antenna panel for UE 101. For example, antenna panel 117 can be a default antenna panel for communication between UE 101 and base station 103, while antenna panel 118 can be a secondary antenna panel. Additionally and alternatively, UE 101 can communicate with base station 103 using multiple antenna panels, having a first antenna panel for uplink, and a second antenna panel for downlink. Similarly. UE 101 can communicate with base station 103 and base station 105 using a single antenna panel, or multiple antenna panels.

According to some aspects, UE 101 or processor 201 can be configured to receive a measurement configuration 109 from base station 101. The measurement configuration 109 can indicate to UE 101 to perform an omni measurement or a directional measurement by using an antenna element of the antenna panel. More detailed operations to be performed by UE 101 or processor 201 are illustrated in FIG. 3, while operations performed by base station 103 are illustrated in FIG. 4.

Figure 3:
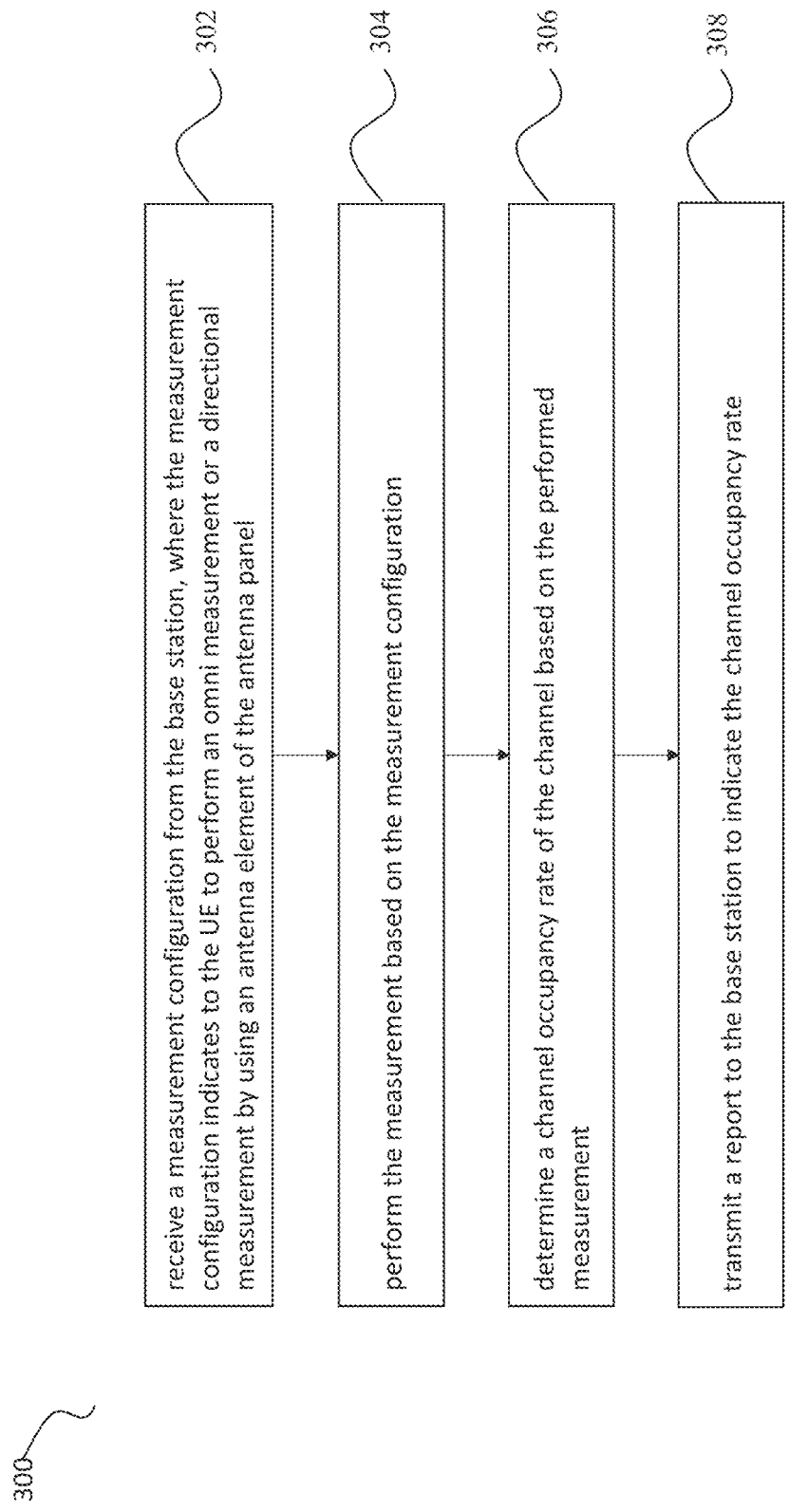
FIGS. 3-4 illustrate example methods performed by a UE or a base station for determining a channel occupancy rate based on measurements performed by an antenna element of an antenna panel, according to some aspects of the disclosure.
Figure 4:
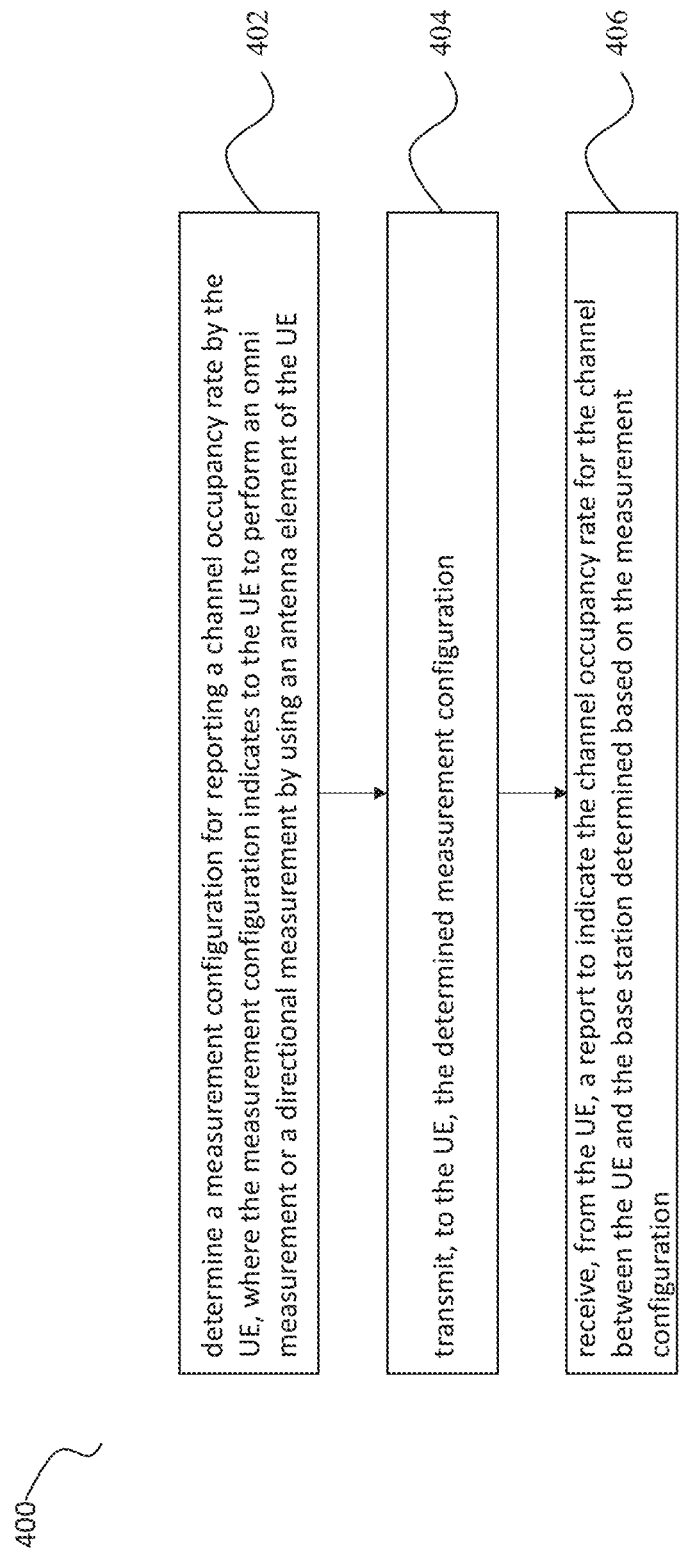
Figure 5:
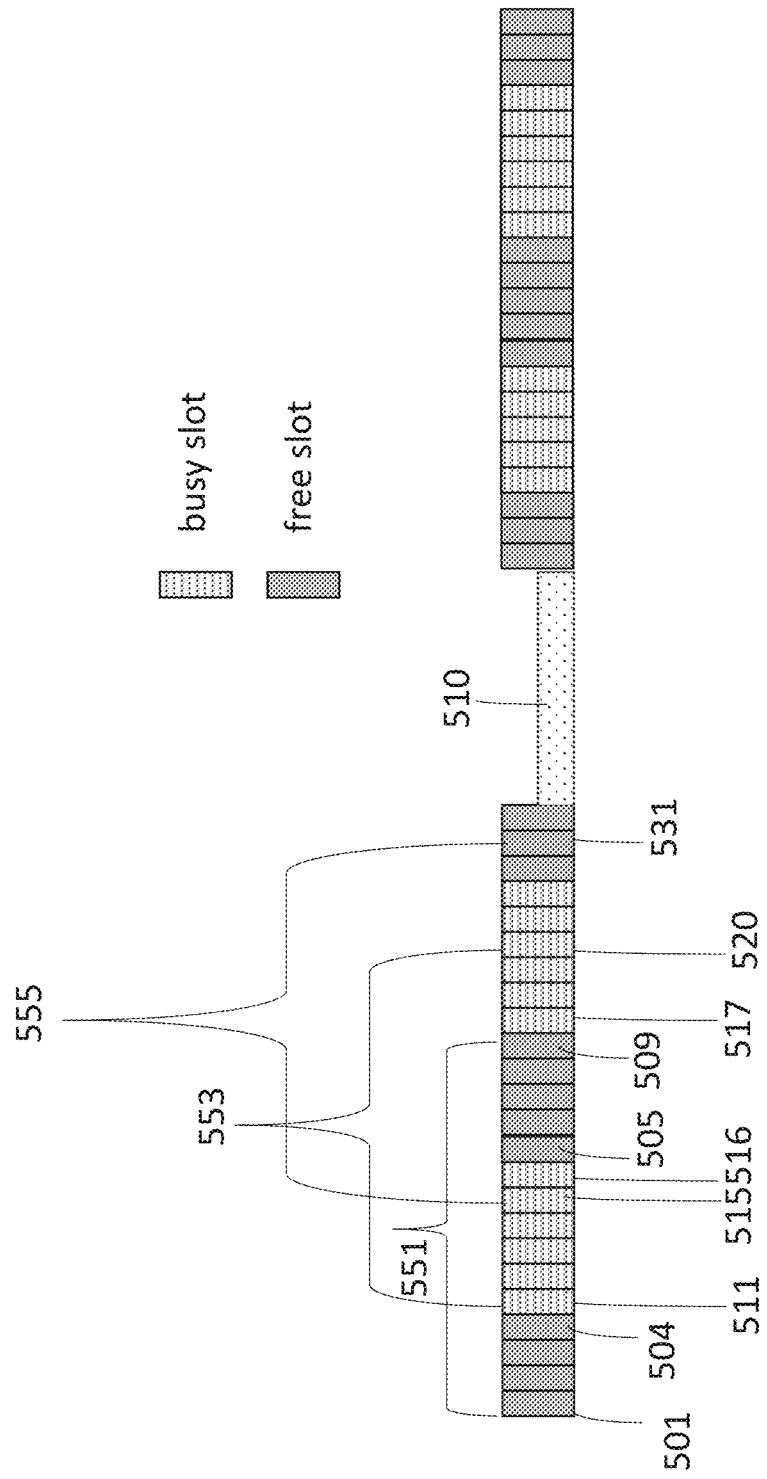
FIG. 5 illustrates an example channel occupancy rate based on measurements performed by an antenna element of an antenna panel, according to some aspects of the disclosure.

FIGS. 3-4 illustrates example methods for determining a channel occupancy rate based on measurements performed by an antenna element of an antenna panel, according to some aspects of the disclosure. FIG. 5 illustrates an example channel occupancy rate based on measurements performed by an antenna element of an antenna panel.

According to some aspects, as shown in FIG. 3, method 300 can be performed by UE 101 to determine a channel occupancy rate based on measurements performed by an antenna element of an antenna panel.

At 302, UE 101 can receive a measurement configuration 109 from base station 103. Measurement configuration 109 indicates to UE 101 to perform an omni measurement or a directional measurement by using an antenna element of the antenna panel. Measurement configuration 109 can be configured by a higher layer signaling, e.g., RRC signaling, and can be configured on a per cell or per UE basis. In detail, measurement configuration 109 can be configured for cell 102. When UE 101 moves out cell 102, anew measurement configuration can be used by UE 101. Additionally and alternatively, measurement configuration 109 can be configured specifically for UE 101. When UE 101 moves out cell 102 to another cell, measurement configuration 109 can still be valid for UE 101.

According to some aspects, measurement configuration 109 is received from base station 103, and indicates to UE 101 to perform measurements by using an antenna element selected from antenna element 111, antenna element 113, or antenna element 115 of antenna panel 117. Measurement configuration 109 can indicate to perform an omni measurement or a directional measurement by using an antenna element of the antenna panel. The antenna element can be a pseudo-omni antenna element or a quasi-sector-omni antenna element including a phase shifter. A directional receiving beam can be formed by adjusting the phase shifter of the antenna element for performing the directional measurement. In addition, measurement configuration 109 can indicate to select multiple antenna elements to perform the measurements.

When performing an omni measurement, UE 101 can measure inferences or signals from all directions of nearby operations of a neighbor cell, other operators or other wireless network, e.g., wireless LAN such as IEEE 802.11ad/11ay activity. When perform a directional measurement, UE 101 can measure interference in only the receiving direction (of the directional antenna) from nearby operations of a neighbor cell, other operators or other wireless network, e.g., wireless LAN such as IEEE 802.11ad/11ay activity. Accordingly, the omni measurement results may be different from directional measurement results. Base station 103 can determine and configure whether an omni measurement or a directional measurement is to be performed. In order to make such a determination, base station 103 can maintain a historically accumulated database to determine whether omni measurement or a directional measurement is to be performed.

According to some aspects, there can be various measurement configuration. Measurement configuration 109 can indicate to UE 101 to sense a first number of slots that are busy among a total number of slots within a sliding window of slots configured by the base station. As shown in FIG. 5, a window 551, a window 553, and a window 555 illustrate a sliding window of slots. Each of the windows contains total 15 slots. Window 551 is a first sliding window starting from slot 501 ending at slot 509. Window 553 is a second sliding window starting from slot 511 ending at slot 520, moving forward 4 slots from window 551. Window 555 is a third sliding window starting from slot 515 ending at slot 531, moving forward 4 slots from window 553. Window 510 is for data transmission. Within window 551, UE 101 can sense 6 slots (slot 511 to slot 516) that are busy, and 9 slots (slot 501 to slot 504, slot 505 to slot 509) that are free. Within window 553, UE 101 can sense 10 slots (slot 511 to slot 516, slot 517 to slot 520) that are busy, and 5 slots (slot 505 to slot 509) that are free.

According to some aspects, measurement configuration 109 can indicate to UE 101 to perform a measurement of received signal strength indicator (RSSI) within a reference signal measurement window. In some examples, the reference signal measurement window can have a periodicity of 5 ms, 10 ms, or 20 ms. In some embodiments, measurement configuration 109 can include a configuration to perform the omni measurement of RSSI, or the directional measurement of RSSI. For example, such a configuration can include an explicit identification to select the omni measurement of RSSI or the directional measurement of RSSI. When the directional measurement of RSSI is to be performed, the measurement can be performed with a configured transmission configuration indicator (TCI) state information of base station 103. Additionally and alternatively, measurement configuration 109 can implicitly indicate to UE 101 to perform the omni measurement of RSSI when the measurement configuration 109 does not include TCI state information, and to perform the directional measurement of RSSI when the measurement configuration includes TC state information of the base station. A TCI state information can specify the source reference signal to be used for the measurement, e.g., synchronization signal blocks (SSB), sounding reference signal (SRS), or channel state information reference signal (CSI-RS). Base station 103 can configure a set of TC state information by a medium access control (MAC) control element (CE) transmission, and use a downlink control information (DCI) transmission to down-select one of the TCI states. As a further extension, with regard to multi-TRP operation, base station 103 can indicate multiple TC states.

Referring back to FIG. 3, at 304, UE 101 can perform the measurements based on the measurement configuration 109 using the selected antenna element.

At 306, UE 101 can determine a channel occupancy rate of the channel based on the performed measurement. According to some aspects, a channel occupancy rate is a real number ranging from 0 to a number larger than 1, instead of a binary value representing busy or free. In some example, when UE 101 is configured to sense a first number of slots that are busy or free among a total number of slots within a sliding window of slots, UE 101 can determine the channel occupancy rate by a quotient of the first number divided by the total number of slots. For example, as shown in FIG. 5, within window 511. UE 101 can sense 6 busy slots (slot 511 to slot 516), and 9 free slots (slot 501 to slot 504, slot 505 to slot 509). Within window 553, UE 101 can sense 10 busy slots (slot 511 to slot 516, slot 517 to slot 520) and 5 free slots. Hence, the channel occupancy rate during window 551 is 6/15=0.4, and the channel occupancy rate during window 553 is 10/15=0.66. Hence, the channel between UE 101 and base station 103 is busier during window 553 (0.66) than window 551.

In some other examples, UE 101 can determine the channel occupancy rate to be a quotient of the measurement of RSSI divided by a channel occupancy threshold value. The channel occupancy threshold value is selected by the UE or the base station based on a channel bandwidth of the channel. When the measurement of RSSI is larger than the channel occupancy threshold value, the channel occupancy rate can be larger than 1. The larger the channel occupancy rate, the busier the channel is.

In some other examples, the channel occupancy rate can be calculated in different ways based on the measurement of RSSI. For example, there can be multiple measurements of RSSI performed during a reporting interval, which can be provided by physical layer functions. Each measurement of RSSI is compared to a channel occupancy threshold value to determine the measurement of RSSI is larger or not than the channel occupancy threshold value. The channel occupancy rate can be calculated as a percentage of the number of measurements of RSSI that is larger than the channel occupancy threshold value divided by the total number of measurements of RSSI within the reporting interval. For example, during a certain report interval, based on RSSI measurement time configuration (RMTC) configuration, there can be a total of 10 measurements of RSSI obtained.

Six of the 10 measurements of RSSI obtained are larger than the channel occupancy threshold value. Accordingly, the channel occupancy rate can be 6/10=60%.

Based on such a channel occupancy rate, a first channel can be less busy than a second channel when the channel occupancy rate of the first channel is smaller than the channel occupancy rate of the second channel. In a wireless system, when LBT is applied, one channel is either free or busy, and cannot be anything in between. Hence, for LBT mechanism, it is not defined that one channel is less busy than another channel. Accordingly, the channel occupancy rate used in the current disclosure can provide more options for scheduling of communication between UE 101 and base station 103. For example, when UE 101 is capable to support component carrier (CA), base station 103 can move or adjust the channel between UE 101 and base station 103 to use another carrier that has a smaller channel occupancy rate than the channel occupancy rate measured by UE 101.

At 308, UE 101 can transmit a report to base station 103 to indicate the channel occupancy rate. In some examples, the report transmitted to base station 103 can include the measurement of RSSI, the channel occupancy rate, and an update to the TC state information.

According to some aspects, FIG. 4 illustrates the operations of method 400 performed by a base station, e.g., base station 103, to determine a channel occupancy rate based on measurements performed by an antenna element of an antenna panel of UE 101.

At 402, base station 103 can determine a measurement configuration for reporting a channel occupancy rate by UE 101. The measurement configuration, e.g., measurement configuration 109, can indicate to the UE to perform an omni measurement or a directional measurement by using an antenna element of the UE. The measurement configuration can indicate to UE 101 to perform a measurement of RSSI within a reference signal measurement window, where the channel occupancy rate is determined as a quotient of the measurement of RSSI divided by a channel occupancy threshold value. Other ways to calculate the channel occupancy rate based on the measurement of RSSI can be used as well. The measurement configuration can indicate to the UE to perform an omni measurement or a directional measurement by using an antenna element of the UE. When a directional measurement of RSSI is to be performed, the measurement is performed with TCI state information of base station 103. In some examples, the TCI state information of base station 103 can be configured by medium access control (MAC) control element (CE).

At 404, base station 103 can transmit, to UE 101, the determined measurement configuration, which can be saved by UE 101 as measurement configuration 109.

At 406, base station 103 can receive, from UE 101, a report to indicate the channel occupancy rate for the channel between UE 101 and base station 103 determined based on the measurements performed by UE 101 based on measurement configuration 109.

Based on such a channel occupancy rate, a first channel can be less busy than a second channel when the channel occupancy rate of the first channel is smaller than the channel occupancy rate of the second channel. Accordingly, a base station can adjust the channel between the UE and the base station to use another carrier that has a smaller channel occupancy rate than the channel occupancy rate received from the UE, when the UE is capable to support component carrier (CA). Additional operations can be performed, e.g., moving the channel between the UE and the base station to use a carrier in a frequency range different from a current frequency range of the channel between the UE and the base station, when the UE supports two different frequency ranges, enabling clear channel assessment (CCA) to control interference in a current cell that includes the UE caused from operations in a neighboring cell of the current cell; or enabling receiver side CCA to control interference to the current cell caused from operations in the neighboring cell. For example, the received report includes the RSSI measurement, and the processor is further configured to adjust a maximum value used in a Clear Channel Assessment (CCA) check to generate a random number for deferred transmission.

Figure 6:
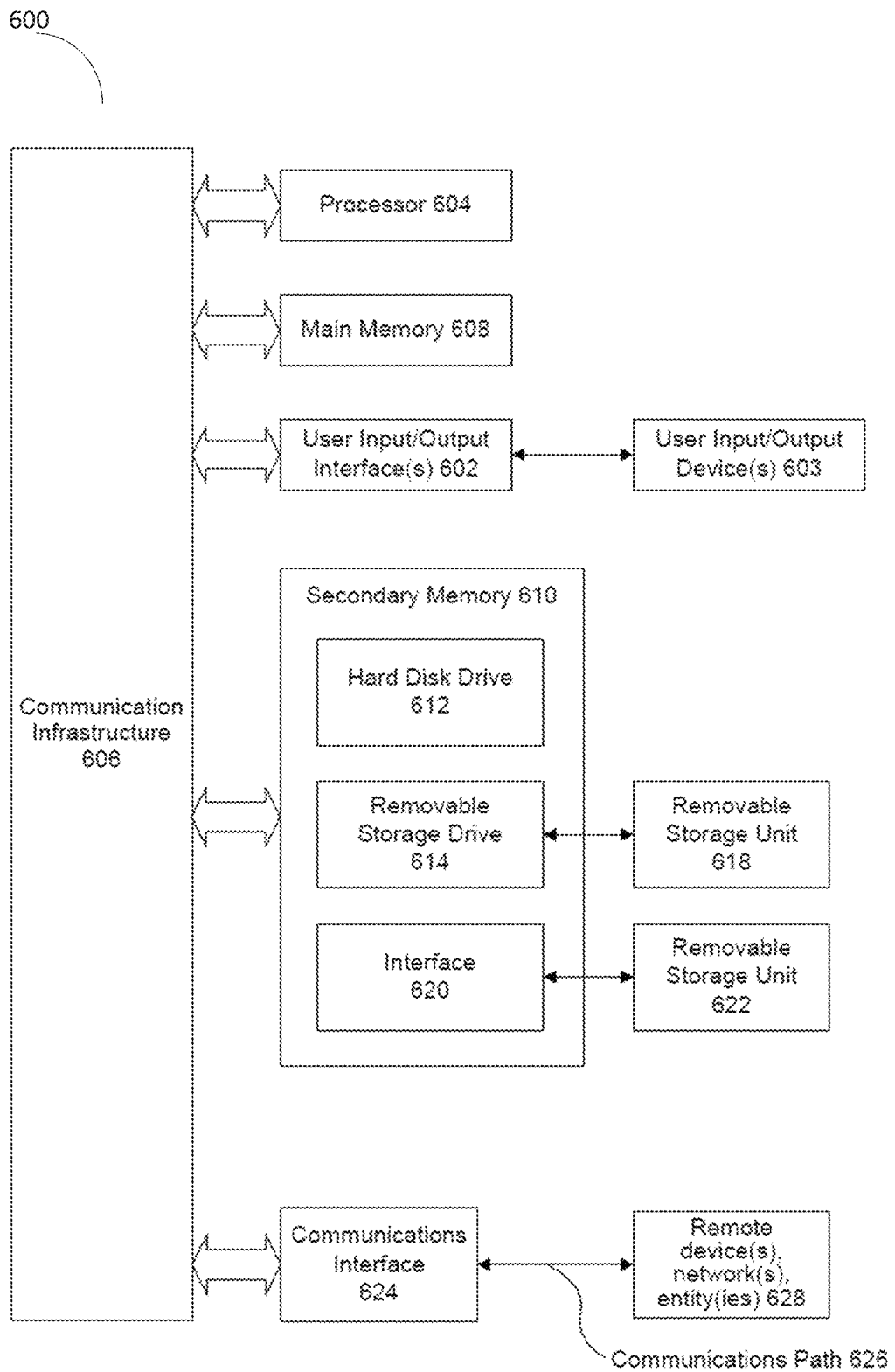
FIG. 6 is an example computer system for implementing some aspects or portion(s) thereof of the disclosure provided herein.

Various aspects can be implemented, for example, using one or more computer systems, such as computer system 600 shown in FIG. 6. Computer system 600 can be any computer capable of performing the functions described herein such as UE 101, base station 103, or base station 105 as shown in FIG. 1 and FIG. 2. Computer system 600 includes one or more processors (also called central processing units, or CPUs), such as a processor 604. Processor 604 is connected to a communication infrastructure 606 (e.g., a bus). Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 608, the removable storage unit 618, the removable storage unit 622 can store instructions that, when executed by processor 604, cause processor 604 to perform operations for a UE or a base station, e.g., UE 101, base station 103, or base station 105 as shown in FIG. 1 and FIG. 2. In some examples, the operations include those operations illustrated and described in FIGS. 3-4.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626. Operations of the communication interface 624 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 6. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth below in the example section.

What is claimed is:

1. A user equipment (UE), comprising:
   one or more antenna panels, wherein an antenna panel of the one or more antenna panels includes a plurality of antenna elements configured to wirelessly communicate with a base station over a channel in an unlicensed spectrum; and
   a processor communicatively coupled to the one or more antenna panels and configured to:
   receive a measurement configuration from the base station, wherein the measurement configuration includes an explicit identification to select an omni measurement or a directional measurement by using an antenna element of the antenna panel;
   perform a measurement based on the measurement configuration;
   determine a channel occupancy rate of the channel based on the performed measurement, wherein the measurement configuration indicates to perform a measurement of received signal strength indicator (RSSI) within a reference signal measurement window, and the channel occupancy rate is determined as a quotient of the measurement of the RSSI divided by a channel occupancy threshold value; and
   transmit a report to the base station to indicate the channel occupancy rate.

2. The UE of claim 1, wherein the measurement configuration indicates to the UE to sense a first number of slots that are busy among a total number of slots within a sliding window of slots configured by the base station, and the processor is configured to determine the channel occupancy rate by a quotient of the first number divided by the total number of slots.

3. The UE of claim 1, wherein the antenna element is a pseudo-omni antenna element or a quasi-sector-omni antenna element including a phase shifter, and wherein a directional receiving beam is formed by adjusting the phase shifter of the antenna element for performing the directional measurement.

4. The UE of claim 1, wherein the unlicensed spectrum includes a frequency band higher than 52.6 Ghz.

5. The UE of claim 1, wherein the antenna element includes a dipole antenna element, a monopole antenna element, a patch antenna element, a loop antenna element, a microstrip antenna element, a single antenna element with multiple apertures, or an antenna element for transmission of radio frequency (RF) signal.

6. The UE of claim 1, wherein the one or more antenna panels include 3 antenna panels, and an antenna panel of the 3 antenna panels includes 2, 4, 8, or 16 antenna elements.

7. The UE of claim 1, wherein the channel occupancy threshold value is selected by the UE based on a channel bandwidth of the channel.

8. The UE of claim 1, wherein the reference signal measurement window has a periodicity of 5 ms, 10 ms, or 20 ms.

9. The UE of claim 1, wherein the measurement configuration includes a configuration to perform the omni measurement of the RSSI, or the directional measurement of the RSSI with configured transmission configuration indicator (TCI) state information of the base station.

10. The UE of claim 1, wherein the measurement configuration indicates to perform the omni measurement of the RSSI when the measurement configuration does not include transmission configuration indicator (TCI) state information of the base station, and to perform the directional measurement of the RSSI when the measurement configuration includes the TCI state information of the base station.

11. The UE of claim 10, wherein the report transmitted to the base station includes the measurement of RSSI, the channel occupancy rate, an update to the TCI state information, an average of a plurality of measurements of the RSSI over a period of time, and an average of a plurality of channel occupancy rates over the period of time.

12. A base station, comprising:
    a transceiver configured to wirelessly communicate with a user equipment (UE) over a channel in an unlicensed spectrum; and
    a processor communicatively coupled to the transceiver and configured to:
    determine a measurement configuration for reporting a channel occupancy rate by the UE, wherein the measurement configuration includes an explicit identification to select an omni measurement or a directional measurement by using an antenna element of the UE;
    transmit, to the UE, the determined measurement configuration; and
    receive, from the UE, a report to indicate the channel occupancy rate for the channel between the UE and the base station determined based on the measurement configuration, wherein the measurement configuration indicates to perform a measurement of received signal strength indicator (RSSI) within a reference signal measurement window, and the channel occupancy rate is determined as a quotient of the measurement of the RSSI divided by a channel occupancy threshold value.

13. The base station of claim 12, wherein the measurement configuration indicates to the UE to perform the omni measurement of the RSSI, or perform the directional measurement of the RSSI with transmission configuration indicator (TCI) state information of the base station.

14. The base station of claim 13, wherein the TCI state information of the base station is configured and updated by medium access control (MAC) control element (CE).

15. The base station of claim 12, wherein the processor is further configured to:
  adjust the channel between the UE and the base station to use a carrier that has a smaller channel occupancy rate than the channel occupancy rate determined by the UE, when the UE is capable of supporting component carrier (CA);
  adjust the channel between the UE and the base station to use another carrier in a frequency range different from a current frequency range of the channel between the UE and the base station, when the UE supports two different frequency ranges;
  enable clear channel assessment (CCA) to control interference in a current cell that includes the UE caused from operations in a neighboring cell of the current cell; or
  enable receiver side CCA to control interference in the current cell caused from operations in the neighboring cell.

16. The base station of claim 15, wherein the received report includes the measurement of the RSSI, and the processor is further configured to adjust a maximum value used in a Clear Channel Assessment (CCA) check to generate a random number for deferred transmission.

17. A method for a user equipment (UE), comprising:
  receiving a measurement configuration from a base station, wherein the measurement configuration indicates to perform a measurement of received signal strength indicator (RSSI) within a reference signal measurement window by using an antenna element of the UE configured to wirelessly communicate with the base station over a channel in an unlicensed spectrum, wherein the measurement of the RSSI is an omni measurement or a directional measurement;
  performing the measurement of the RSSI based on the measurement configuration;
  determining a channel occupancy rate based on the performed measurement, wherein the channel occupancy rate is determined as a quotient of the measurement of the RSSI divided by a channel occupancy threshold value; and
  transmitting a report to the base station to indicate the channel occupancy rate, wherein the report includes the measurement of the RSSI.

18. The method of claim 17, wherein the measurement configuration indicates to the UE to perform the omni measurement of the RSSI when there is no transmission configuration indicator (TCI) state information of the base station included in the measurement configuration, or perform the directional measurement of the RSSI when the TCI state information of the base station is included in the measurement configuration.

* * * * *